Aug. 15, 1933.  C. A. RENNACKER  1,923,014
COLANDER
Filed June 24, 1932
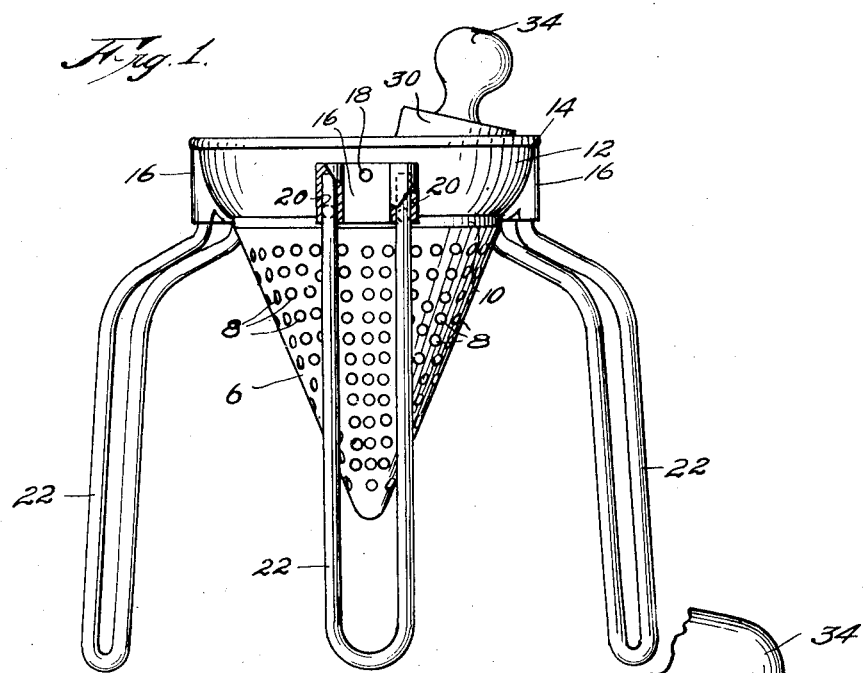
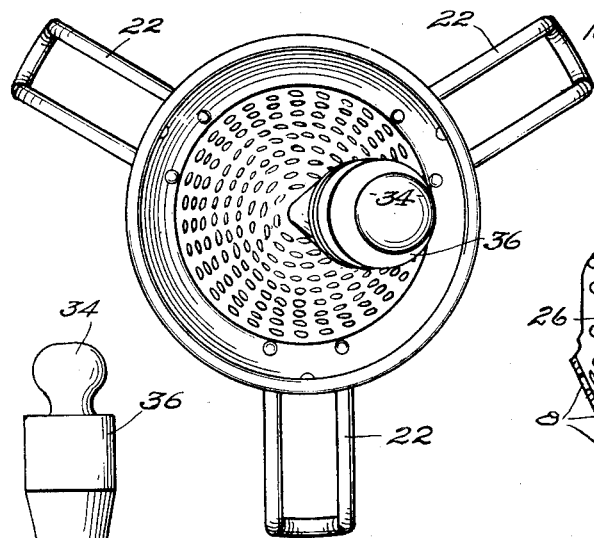
INVENTOR,
Clarence A. Rennacker
BY Hovey & Hamilton,
ATTORNEYS.

Patented Aug. 15, 1933

1,923,014

UNITED STATES PATENT OFFICE 1,923,014

COLANDER

Clarence A. Rennacker, Kansas City, Mo.

Application June 24, 1932. Serial No. 619,018

8 Claims. (Cl. 146—172)

This invention relates to utensils of the type used in crushing and straining foods of various kinds and the general class of equipment to which this invention relates includes colanders having conical perforated receptacles and coacting pestles that travel within the receptacle to force crushed foods and juices through the perforations thereof.

The primary object of this invention is the simplification of the structural features normally found in colanders of this kind, and among some of the aims of the invention is the provision of more effective and fewer parts for supporting the receptacle in operative position, the relation of the supporting members of the receptacle being such that great force might be exerted in the crushing operation without relatively displacing any of the component parts of the entire apparatus.

A further object of the invention is the contemplation of an improved pestle to be used in connection with the conical receptacle, which pestle has an effective "breaking" element to preclude crawling of the food pulp upwardly along the pestle to a point where it reaches an objectionable place. These objects, as well as numerous minor ones, will be fully described in the following specification, referring to the accompanying drawing, wherein:

Figure 1 is a side elevation of a colander embodying the features of this invention.

Fig. 2 is a top plan view of the same.

Fig. 3 is an enlarged, fragmentary, vertical section through a portion of the colander showing the pestle in elevation, and, Fig. 4 is a side view of a pestle of modified form.

Colanders of the type to which this invention relates are well known in the art and it is also understood that their objectionable features include a multiplicity of parts to be assembled when bringing the colander into use; the failure of such parts to properly and sufficiently support the perforated receptacle of the colander when subjected to heavy work; and the disagreeable "crawling" of the food pulp upwardly along the pestle and out of the receptacle as the work is being performed. These objections, as well as many others, are effectively overcome by the structure built into the preferred embodiment of the colander.

The perforated receptacle 6 is cone-shaped at its lower portion and has perforations 8 formed therethrough. The apex of the cone-shaped portion of receptacle 6 is spherical as shown in Fig. 3, and the line of greatest diameter of receptacle 6 is provided with a vertical, annular wall 10, which is exceptionally narrow and against which bears the later described brackets. From wall 10, and formed around the mouth of receptacle 6, there is created a continuous, arcuate, divergent lip 12, which is rolled at its upper edge to form a bead 14. This lip is integral with the remaining portion of receptacle 6 and has rigidly secured thereto a series of brackets 16 through the medium of rivets 18 passing through the lip proper as shown in Fig. 3. The lower part of each bracket 16 extends against wall 10 and lip 12 completely overlies all of bracket 16 so that the supporting force required will be exerted along a line substantially perpendicular to lip 12 from points thereunder. Each bracket 16 has a pair of sockets 20 formed therein to receive the free ends of U-shaped standards 22 which are resilient and require pulling apart at said free ends before they may be moved into engagement with sockets 20. This form of bracket and standard construction permits the making of a colander with an exceptionally few number of parts and presents a very rigid article that is easy to clean.

A novel pestle 24 is associated with receptacle 6 when it is desired to crush or force materials through perforations 8 of receptacle 6. The lower portion of pestle 24 is cone-shaped as at 26 and the cone-shaped portion is substantially coextensive in length with the lowermost cone-shaped part of receptacle 6. The apex of cone-shaped portion 26 of pestle 24 is also spherical to snugly engage the spherical apex of receptacle 6. From the line of greatest diameter 28 of cone-shaped portion 26, pestle 24 is made to form a cylindrical portion 30 which extends upwardly to a point beyond the uppermost edge of lip 12. This cylindrical portion 30 commences at a point just below the lowermost plane of lip 12 and practically spans the distance between the horizontal plane of the upper edge of lip 12 and the horizontal plane of the lower edge thereof. A continuous annular groove 32 is formed around cylindrical portion 30 in parallel relation with the line of connection 28 and spaced therefrom. This groove 32 creates an effective break for pulp which might be creeping upwardly along pestle 24 and when groove 32 is reached thereby, the same falls back into receptacle 6. Above receptacle 6 and at the end of cylindrical portion 30 there is formed a grip 34 which may be grasped by the operator when moving pestle 24 around within receptacle 6.

Cylindrical portion 30 precludes a great amount of space being left before itself and lip 12, and in the event a slight amount of food pulp does rest upon lip 12, it is forced therefrom and back into receptacle 6 by cylindrical portion 30 in a most efficient manner. Groove 32 lies in substantially the same horizontal plane as the bottom edge of lip 12 and the exceptionally deep shoulder 36 formed at the top of cylindrical portion 30 protects the hands and fingers of the operator against contact with the food pulp.

Many advantages are found in a colander structure of this character and while the same have not all been enumerated herein, the same will become apparent in using a colander of this type.

Any suitable materials may be used in constructing the parts of the utensil and slight variation in form and relation of parts may be made without departing from the scope of the appended claims.

Having thus described the invention, what is claimed as new and desired to be secured by Letters Patent is:

1. In a colander of the kind described, a perforated conical receptacle; a continuous arcuate, annular, divergent lip integral with the receptacle at its mouth; a series of spaced-apart brackets secured to said annular lip against its outer face; and a standard removably associated with each bracket respectively, said brackets each having an inner face formed to snugly fit the contour of said lip whereby to completely underlie the same when in position.

2. In a colander of the kind described, a perforated conical receptacle; a continuous arcuate, annular, divergent lip integral with the receptacle at its mouth; a plurality of spaced-apart brackets rigidly secured to said annular lip against its outer face; a pair of spaced-apart vertical sockets formed in each of said brackets; and a standard removably associated with each of said brackets respectively, said standards fitting into said sockets with their fitted portion positioned in a plane substantially perpendicular to the overlying portion of the lip.

3. A colander of the kind described comprising a perforated conical receptacle; a continuous arcuate, divergent lip integral with the receptacle at its mouth; a series of brackets secured to said annular lip against its outer face, whereby the lip overlies the brackets; and a pestle having a conical portion commensurate with the conical receptacle, a cylindrical portion continuing from the point of greatest diameter of said pestle to a plane above the top of the colander; and a grip formed on the end of said cylindrical portion.

4. A colander of the kind described comprising a perforated conical receptacle; a continuous, arcuate, divergent lip integral with the receptacle at its mouth; a series of brackets secured to said annular lip against its outer face, whereby the lip overlies the brackets; and a pestle having a conical portion commensurate with the conical receptacle, a cylindrical portion continuing from the point of greatest diameter of said pestle to a plane above the top of the colander; an annular groove formed around said cylindrical portion in spaced, parallel relation with the line of connection between conical portion and cylindrical portion; and a grip on the end of said cylindrical portion.

5. In a colander of the kind described, a perforated conical receptacle; a continuous, arcuate; divergent lip integral with the receptacle at its mouth; and a pestle having a conical crushing portion substantially coextensive in length with the said conical receptacle, a cylindrical portion continuing from the point of greatest diameter of the conical portion to a plane above the said lip, and an annular groove formed around said cylindrical portion in spaced parallel relation with the line of connection between conical portion and cylindrical portion, said cylindrical portion having a diameter equal to the greatest diameter of said conical portion.

6. In a colander of the kind described, a perforated conical receptacle; a continuous, arcuate, divergent lip integral with the receptacle at its mouth; and a pestle having a conical crushing portion substantially coextensive in length with the said conical receptacle, a cylindrical portion continuing from the point of greatest diameter of the conical portion to a plane above the said lip; an annular groove formed around said cylindrical portion in spaced, parallel relation with the line of connection between conical portion and cylindrical portion; and a grip formed at the end of said conical portion, said grip being of a diameter substantially less than the conical portion, the cylindrical portion having a diameter equal to the greatest diameter of said conical portion.

7. In a colander of the kind described, a perforated conical receptacle; a continuous, arcuate, divergent lip integral with the receptacle at its mouth, the lower and upper edges of said lip being in spaced-apart horizontal planes; and a pestle having a conical crushing portion bearing against said conical receptacle for a portion of its length, a substantially cylindrical portion continuing from the point of greatest diameter within the conical receptacle to a point above the upper edge of said continuous lip, and an annular groove extending around said cylindrical portion in substantially the same horizontal plane as the lower edge of said lip.

8. A colander for crushing fruit and vegetables comprising a receptacle having a perforated conical portion, a normally vertical, annular wall around the said conical portion at its line of greatest diameter, and a continuous annular flare, arcuate in cross section, extending upwardly and outwardly from said wall; a series of spaced-apart, socketed brackets riveted to said annular flare and bearing against said annular wall; and a standard removably fitted into the sockets of each bracket respectively, said brackets being formed to lie against the outer face of said annular flare and to underlie the same.

CLARENCE A. RENNACKER.